United States Patent
Johannesson et al.

(10) Patent No.: US 11,467,030 B2
(45) Date of Patent: Oct. 11, 2022

(54) METHOD AND ARRANGEMENTS FOR PROVIDING INTENSITY PEAK POSITION IN IMAGE DATA FROM LIGHT TRIANGULATION IN A THREE-DIMENSIONAL IMAGING SYSTEM

(71) Applicant: SICK IVP AB, Linköping (SE)

(72) Inventors: Mattias Johannesson, Linköping (SE); Christoffer Malmgren, Linköping (SE)

(73) Assignee: SICK IVP AB, Linköping (SE)

( * ) Notice: Subject to any disclaimer, the term of this patent is extended or adjusted under 35 U.S.C. 154(b) by 14 days.

(21) Appl. No.: 16/925,520

(22) Filed: Jul. 10, 2020

(65) Prior Publication Data

US 2021/0048341 A1 Feb. 18, 2021

(30) Foreign Application Priority Data

Aug. 16, 2019 (EP) .................................. 19192183

(51) Int. Cl.
*G06K 9/00* (2022.01)
*G01J 1/44* (2006.01)
(Continued)

(52) U.S. Cl.
CPC .................. *G01J 1/44* (2013.01); *G01C 3/08* (2013.01); *G06T 7/70* (2017.01); *G06V 10/44* (2022.01);
(Continued)

(58) Field of Classification Search
CPC ........................................................ G01J 3/00
See application file for complete search history.

(56) References Cited

U.S. PATENT DOCUMENTS

2014/0073863 A1* 3/2014 Engelbrecht ......... A61B 5/7264
600/301
2017/0010356 A1* 1/2017 Demirel ................ G01B 11/25
(Continued)

FOREIGN PATENT DOCUMENTS

JP H03-205503 A 9/1991
JP 2006261436 A 9/2006
(Continued)

OTHER PUBLICATIONS

D. K. Naidu et al: "A Comparative Analysis of Algorithms for Determining the Peak Position of a Stripe to Sub-pixel Accuracy", Procedings of the British Machine Vision Conference 1991, 1991, pp. 217-225, XP055605882, DOI: 10.5244/C.5.28 ISBN: 978-3-540-197 * abstract, section 7 *.
(Continued)

*Primary Examiner* — Hadi Akhavannik
(74) *Attorney, Agent, or Firm* — Duane Morris LLP; Gregory M. Lefkowitz

(57) ABSTRACT

Provision of a position of an intensity peak in image data produced by an image sensor in response to light sensed by the image sensor after the light has reflected on an object as part of light triangulation performed in a three-dimensional imaging system. Devices are configured to obtain the image data and determine which of first and other, second, peak characteristics that the intensity peak is associated with. The position is provided according to a first computing algorithm if the intensity peak is associated with the first peak characteristics and according to a different, second computing algorithm if the intensity peak is associated with the second peak characteristics.

15 Claims, 9 Drawing Sheets

(51) Int. Cl.
  *G06T 7/70* (2017.01)
  *G01C 3/08* (2006.01)
  *G06V 10/44* (2022.01)

(52) U.S. Cl.
  CPC ............... *G01J 2001/4433* (2013.01); *G06T 2207/10028* (2013.01); *G06T 2207/10144* (2013.01)

(56) References Cited

U.S. PATENT DOCUMENTS

2017/0069098 A1* 3/2017 Johannesson ........... G06T 7/593
2018/0203249 A1* 7/2018 Filhaber ................. G01B 11/14
2019/0353767 A1* 11/2019 Eberspach ............ G01J 1/4228

FOREIGN PATENT DOCUMENTS

| JP | 2012-251893 A | 12/2012 |
| JP | 2013-064644 A | 4/2013 |
| JP | 2016-530485 A | 9/2016 |

OTHER PUBLICATIONS

Josep Forest et al., Laser stripe peak detector for 3D scanners A FIR filter approach, Proceedings of the 17th International Conference on Pattern Recognition.

* cited by examiner

METHOD AND ARRANGEMENTS FOR PROVIDING INTENSITY PEAK POSITION IN IMAGE DATA FROM LIGHT TRIANGULATION IN A THREE-DIMENSIONAL IMAGING SYSTEM

This application claims priority to European Patent Application No. EP19192183, filed Aug. 16, 2019, the entire contents of which are hereby incorporated by reference.

TECHNICAL FIELD

Embodiments herein concern a method and arrangements for provision of a position of an intensity peak in image data produced by an image sensor in response to light sensed by the image sensor after the light has reflected on an object as part of light triangulation performed in a three-dimensional imaging system.

BACKGROUND

A digital image is typically defined as an array of pixels. The number of pixels in the array is usually referred to as the resolution. Each pixel is represented by, i.e. is associated with, one or more pixel values comprising information about the image for the position of the pixel. In a grayscale image the pixel is represented by a non-negative integer value describing the intensity of that pixel. The bit-depth of an image define the range of values that a pixel can have.

Industrial vision cameras and systems for factory and logistic automation may be based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by so called "sheet of light", e.g. laser-line, 3D triangulation. Laser is often preferred but also other light sources able to provide the "sheet of light" can be used, e.g. light sources able to provide light that stays focused and do not spread out to much, such as light provided by a Light Emitting Diode (LED).

3D machine vision systems are often based on such sheet of light triangulation. In such a system there is a light source illuminating the object with a specific light pattern, such as the sheet of light as the specific light pattern, e.g. resulting in a light, or laser, line on the object and along which line 3D characteristics of the object can be captured, corresponding to a profile of the object. By scanning the object with such a line, i.e. performing a line scan, 3D characteristics of the whole object can be captured, corresponding to multiple profiles.

3D machine vision systems or devices that use a sheet of light for triangulation may be referred to as systems or devices for 3D imaging based on light, or sheet of light, triangulation, or simply laser triangulation when laser light is used.

Conventionally, to produce a 3D-image based on light triangulation, reflected light from an object to be imaged is captured by an image sensor of a camera and intensity peaks are detected in the image data since these occur at positions corresponding to locations on the imaged object with the incident light, e.g. corresponding to a laser line, that was reflected from the object. The position in the image of a detected peak will map to a position on the object from where the light resulting in the peak was reflected. Each peak has both height and width because of how the light is reflected in practice, where the light will always spread and diffuse to some extent when reflected from the object, even in the case of laser light. This means that a peak involves multiple consecutively occurring pixels in the image, e.g. along a certain direction, such as in a column of pixels, in the image.

For finding the positions of the peaks in the image, there is conventionally applied an algorithm that operates on the image data and provides the peak position, typically by finding a position corresponding to the center of the peak, e.g. using center-of-gravity or a similar algorithm.

In view of the above, it is realized that the accuracy of the 3D images, and thus also the ability of providing accurate 3D data and images, depend on the ability to be able to identify and find positions of intensity peaks in image data.

SUMMARY

In view of the above an object is to provide one or more improvements or alternatives to the prior art, such as enabling 3D imaging of an object with improved accuracy and in particular when the 3D imaging is based on an image sensor sensing light reflected from the object as part of light triangulation performed by a 3D imaging system.

Objects with surfaces, reflecting the light, that are mainly opaque works well with conventional methods, such as based on a single computing algorithm for finding a position of the center of intensity peaks and which position maps well to the location on the object surface that reflected the light resulting in the intensity peak. However, it has turned out that this does not work well when the surface from which the light is reflected is of a translucent or transparent material, with substantial reflection from within and/or via the material and no or very little reflection in the actual surface. Glue and glass are examples of such materials. A problem in this case is not only relating to weaker and more "spread out" intensity peaks, but also to that the center of the intensity peak has been observed to no longer be a good measure. The result is reduced accuracy where a resulting 3D image will not be able to capture parts of the object with desirable or even required accuracy depending on the circumstances and/or application area. Instead it has been observed that position of an edge of the intensity peak is better to use in these cases. That is, in cases of an intensity peak resulting in from reflection on a surface position of an object with material that is substantially translucent or transparent, e.g.

a surface of wet glue or of glass, a computing algorithm for edge detection of an intensity peak may be best to use, while in case of an intensity peak resulting from reflection on an opaque surface of the object, another computing algorithm for center detection of an intensity peak may be best to use. Depending on material properties and the configuration of the imaging system being used, the edge to detect is either the first or last, as will readily be recognized by the skilled person in a practical situation. Thus, in the following, simply "edge", or "first edge" may be referred to and be used in examples, in order to simplify description, but this is not intended to be limiting.

However, in practice it is common with an object to be imaged that is not only having mainly opaque surfaces or only substantially translucent or transparent surfaces as described above, but a mix of both kind of surfaces. In other words, applying only a single computing algorithm for finding positions relating to the intensity peaks is not sufficient for such objects with mixed type of surfaces since some part of the object will then not be accurately captured by the 3D image.

In view of the above, it would be desirable with a solution that can handle an object with both kind of surfaces and thereby enable provision of 3D images to more accurately capture 3D characteristics of the object, such as height variations in the surface.

Further, from the above discussion, it should be realized that it cannot be ruled out that there may be some materials and surfaces of an object to be imaged that would benefit from some other computer algorithms than those mentioned above.

According to a first aspect of embodiments herein, the object is achieved by one or more devices for providing a position of an intensity peak in image data produced by an image sensor in response to light sensed by the image sensor after the light has reflected on an object as part of light triangulation performed in a three-dimensional imaging system. The one or more devices are configured to obtain the image data and to determine which of first and other, second, peak characteristics that the intensity peak is associated with. The one or more devices are further configured to provide the position according to a first computing algorithm operating on the image data if the intensity peak is associated with the first peak characteristics and according to a different, second computing algorithm operating on the image data if the intensity peak is associated with the second peak characteristics.

According to a second aspects of embodiments herein, the object is achieved by a method, performed by one or more devices, for providing a position of an intensity peak in image data produced by an image sensor in response to light sensed by the image sensor after the light has reflected on an object as part of light triangulation performed in a three-dimensional imaging system. The one or more devices obtain the image data and determine which of first and other, second, peak characteristics that the intensity peak is associated with. The one or more devices further provide the position according to a first computing algorithm operating on the image data if the intensity peak is associated with the first peak characteristics and according to a different, second computing algorithm operating on the image data if the intensity peak is associated with the second peak characteristics.

According to a third aspect of embodiments herein, the object is achieved by a computer program comprising instructions that when executed by said one or more devices causes the one or more devices to perform the method according to the second aspect.

According to a fourth aspect of embodiments herein, the object is achieved by a carrier comprising the computer program according to the third aspect.

Embodiments herein are based on that at least two computing algorithms, such as discussed above are available, and potentially both are used for each intensity peak, but only one is in the end used for providing the position to be used in the 3D image, which of course should be the algorithm best suitable as discussed herein. Using the best suitable algorithm is enabled by determining which of the two peak characteristics that the intensity peak is associated with and then providing the position accordingly. Using peak characteristics for this purpose is possible since, as indicated above and explained further elsewhere herein, the characteristics of the peak indicate which computing algorithm of the two that is best suitable for providing a position that most accurately map to the location on the object's surface that reflected the light resulting in the intensity peak.

Hence, thanks to embodiments herein, it is enabled provision of more accurate 3D images object by means of light, e.g. laser, triangulation performed by a 3D-imaging system when the object comprise a mix of surfaces with different properties that reflects light differently and thereby benefit from different ways of finding positions of the intensity peaks. In particular more accurate 3D images are enabled when an object being imaged comprises surfaces that are mainly opaque and surfaces that to some substantial degree are translucent or transparent, such as in the case of object that comprise some solid material surfaces and some with e.g. glue. Such object may be formed when a solid first part, that is to be mounted to another second part, for this purpose has been provided with glue.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
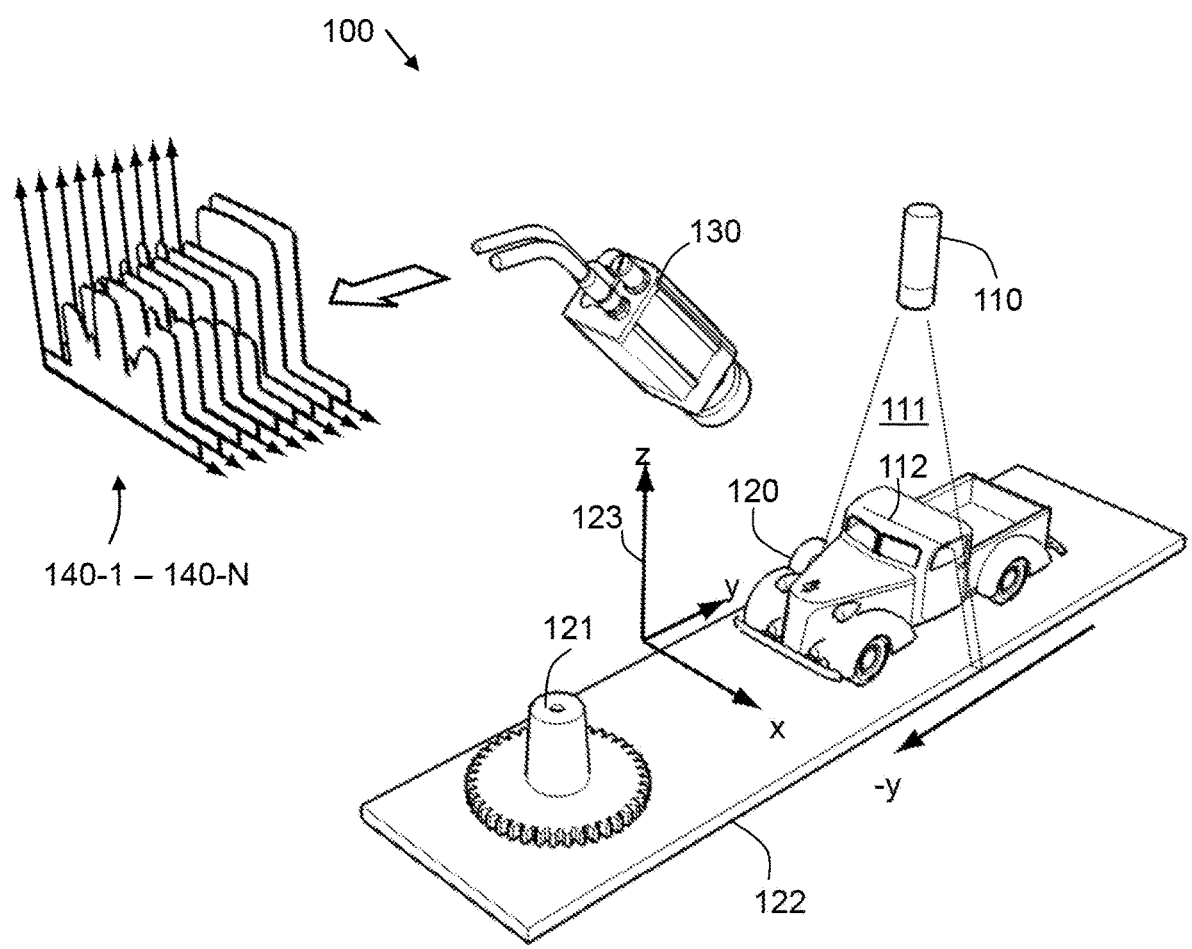
FIG. 1 schematically illustrates a triangulation based 3D imaging system for provision of 3D images and in which systems embodiments herein may be implemented.

FIG. 1 schematically illustrates an example of such type of 3D imaging system as mentioned in the Background, namely a 3D imaging system 100, that thus also is an example of a machine vision system. As will be explained further below the system 100 may be used for implementing embodiments herein.

The system 100 is configured to perform light triangulation, here in the form of sheet of light triangulation as mentioned in the Background. The system 100 further comprises a light source 110, e.g. a laser, for illuminating objects to be imaged with a specific light pattern 111, in the figure exemplified and illustrated as a sheet of light. The light may, but need not to be, laser light, as also was discussed in the Background. In the shown example, the objects are exemplified by a first object 120 in the form of a car and a second object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112 on the first object 120. The specific light pattern 111 is reflected by the object, more specifically by portions of the object at the intersection, i.e. at the light line 112 in the shown example. The measuring system 100 further comprises a camera unit 130 comprising an image sensor (not shown in FIG. 1A), which is arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera unit 130 and the image sensor, and corresponding image data may be produced and provided for further use. For example, in the shown example, the specific light pattern 111 will at the light line 112 on a portion of the car roof of the first object 120 be reflected towards the camera unit 130 and image sensor, which thereby may produce and provide image data with information about said portion of the car roof. With knowledge of the geometry of the measuring system 100, e.g. how image sensor coordinates relate to world coordinates, e.g. coordinates of a coordinate system 123, e.g. Cartesian, relevant for the object being imaged and its context, the image data may be converted to information on 3D characteristics, e.g. a 3D shape or profile of the object being imaged in a suitable format. The information on said 3D characteristics, e.g. said 3D shape(s) or profile(s), may comprise data describing 3D characteristics in any suitable format.

By moving e.g. the light source 110 and/or the object to be imaged, such as the first object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profile images 140-1-140-N of the first object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera unit 130 may be moved over the object, so that all portions of the object, or at least all portions facing the light source 110, are illuminated and the camera unit receives light reflected from all parts of the object desirable to image.

Figure 2:
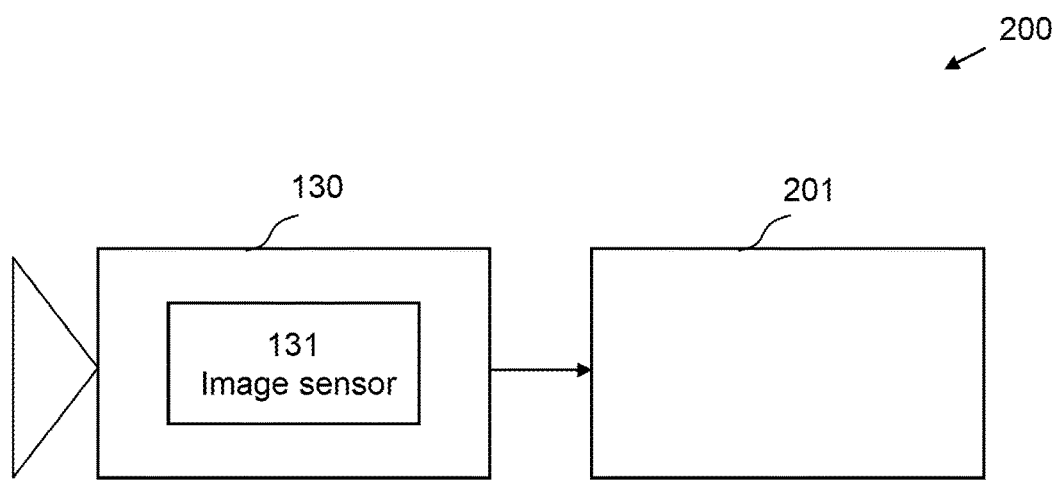
FIG. 2 schematically illustrates an exemplary system that may be configured to carry out embodiments herein.

As understood from the above, an image provided by the camera unit 130 and the image sensor, e.g. of the first object 120, may correspond to any one of the profile images 140-1-140-N. Each position of the contour of the first object shown in any of the profile images 140-1-140-N are determined based on identification of intensity peaks in image data captured by the image sensor and on finding the positions of these intensity peaks FIG. 2 schematically illustrates an exemplary system 200 comprising one or more devices, that may be configured to carry out embodiments herein as described in further detail below. The system 200 comprises a camera unit that may be the same camera unit 130 mentioned above in relation to FIG. 1 and that in turn comprises an image sensor 131 that may be the same image sensor discussed above in relation to FIG. 1. Images and/or information derived from images provided by the camera unit 130 and the image sensor 131 may be desirable to transfer, e.g. transmit, for further processing outside the camera unit 130, e.g. to a computing device 201, such as a computer or similar. Such further processing may additionally or alternatively be performed by a separate computing unit or device (not shown), i.e. separate from the image processor 131, but still comprised in, e.g. integrated with, the camera unit 130. The system 200 may be fully or partly comprised in, i.e. belong to, the 3D imaging system 100.

As a development towards embodiments herein, the situation indicated in the Background will be further elaborated upon.

Objects with surfaces, reflecting the light, that are mainly opaque works well with conventional methods, such as based on a single computing algorithm for finding a position of the center of intensity peaks and which position maps well to the location on the object's surface that reflected the light resulting in the intensity peak. However, it has been observed that this does not work well when the surface from which the light is reflected is of a translucent or transparent material, with substantial reflection from within and/or via the material and no or very little reflection in the actual surface. The translucent or transparent material is typically deposited on an opaque substrate. Glue and glass are examples of such materials. A problem in this case is not only relating to weaker and more "spread out" intensity peaks, but also to that the center of the intensity peak has been observed to no longer be a good measure. The result is reduced accuracy where a resulting 3D image will not be able to capture parts of the object with desirable or even required accuracy depending on the circumstances and/or application area. Instead it has been observed that the position of the edge of the intensity peak is better to use in these cases. That is, in cases of an intensity peak resulting in from reflection on a surface position of an object with material that is substantially translucent or transparent, e.g. a surface of wet glue or of glass, a computing algorithm for edge detection of an intensity peak may be best to use, while in case of an intensity peak resulting from reflection on an opaque surface of the object, another computing algorithm for center detection of an intensity peak may be best to use.

However, in practice it is common with an object to be imaged that is not only having mainly opaque surfaces or only substantially translucent or transparent surfaces as described above, but a mix of both kind of surfaces. In other words, applying only a single computing algorithm for finding positions relating to the intensity peaks is not sufficient for such objects with mixed type of surfaces since some part of the object will then not be accurately captured by the 3D image.

In view of the above, it would be desirable with a solution that can handle an object with both kind of surfaces and thereby enable provision of 3D images to more accurately capture 3D characteristics of the object, such as height variations in the surface.

Figure 3:
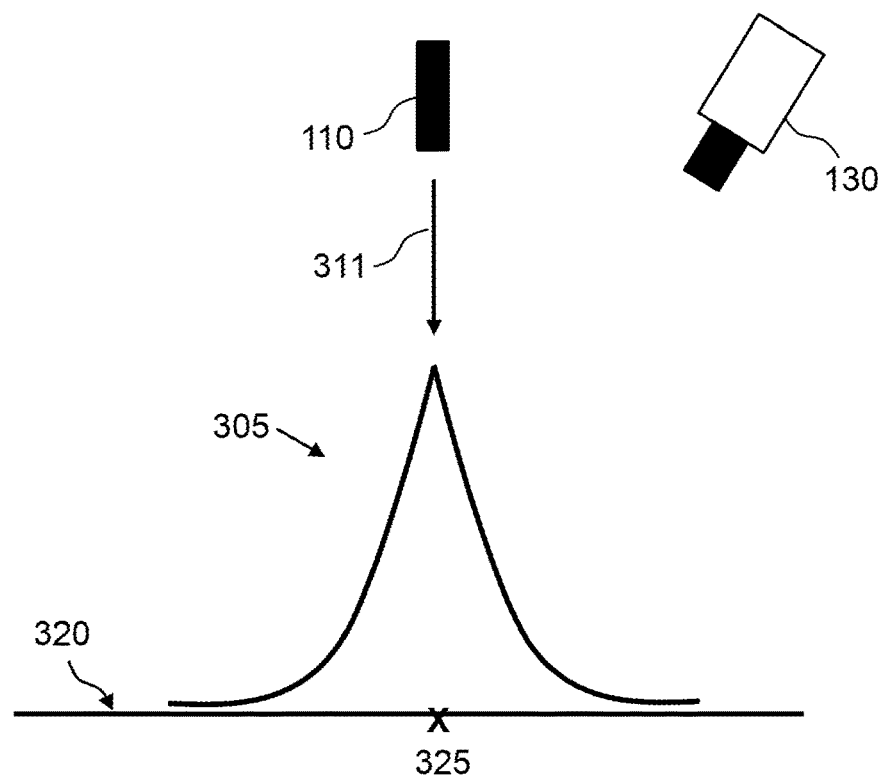
FIG. 3 schematically exemplifies a situation when a center position of an intensity peak is a good measure of a surface position on an object.

FIG. 3 schematically exemplifies a situation when a center position of an intensity peak 305 is a good measure of a surface position 325 on an object. To facilitate understanding here, reference is made to FIG. 1 and the light source 110 and the camera 130 in FIG. 3 may, as indicated, be the those of the 3D imaging system 100 of FIG. 1. The light source 110 here provides light 311 incident on a surface 320 of the object and more specifically on the surface position 325. The incident light may thus correspond to part of the specific light pattern 111 incident on a certain surface position on the object 120, e.g. a surface position covered by the light line 112. The surface 320 including at the surface position 325 are opaque and thus, as schematically shown in the figure, the center position of the intensity peak 305 provides an accurate measure of the surface position 325. In other words, on a conventional material, a narrow and strong reflection can be observed, and the center of an intensity peak corresponding to the observed reflection is a good estimate for the position However, light, e.g. laser light, may not cause any reflection on e.g. a wet semi-transparent glue surface. Instead a weak "glow" may be seen as an effect of the laser reflecting and scattering within the material. This cause a very weak and quite wide observed reflection, as schematically illustrated in the following figures.

Figure 4:
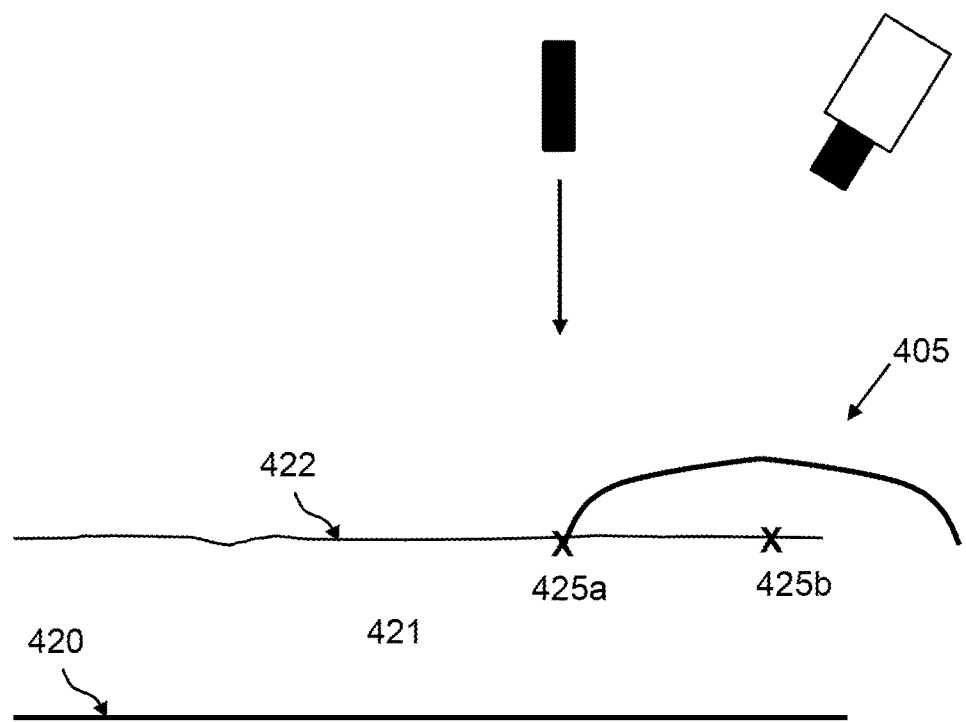
FIG. 4 schematically exemplifies a situation when an edge position of an intensity peak is a better measure of a surface position on an object than is a center position of the intensity peak.

FIG. 4 schematically exemplifies a situation when an edge position of an intensity peak 405 is a better measure of a first surface position 425a on an object than would be a center position of the intensity peak. As can be seen, the figure has similarities with the preceding figure but focus in the following will only be on the differences. The light source 110 here provides light 411 incident on a surface 422 of the object and more specifically on the surface position 425a. The surface 422 is here a substantially translucent or transparent, such as semi-transparent, surface of a translucent or transparent material layer 421, e.g. a glue or glass layer, of a certain first thickness and that may be located, e.g. by deposition, on an underlying opaque surface 420 of the object. The object may be the same object as in FIG. 3 but the surface 422 being located elsewhere on the object than the surface 320, or the underlying opaque surface 420 may be the surface 320 that has been covered by the a translucent or transparent material layer 421. As schematically shown in the figure, the edge position of the intensity peak 405 here provides a good and more accurate measure of the surface position 425a than would the center position, which if used rather would indicate a second surface position 425b.

Figure 5:
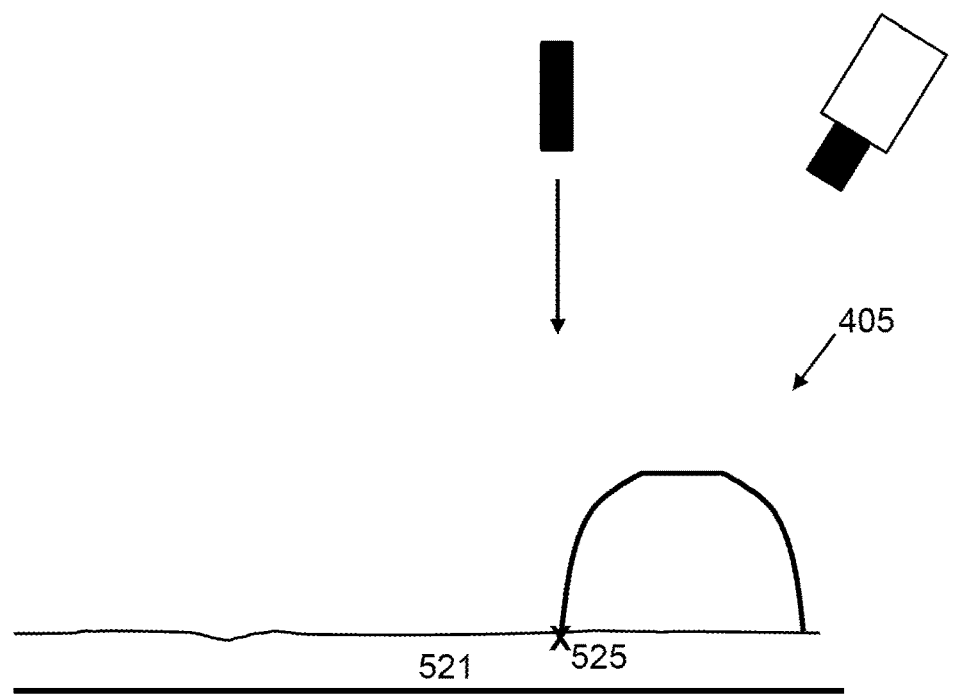
FIG. 5 schematically exemplifies another situation when an edge position of an intensity peak is a good and better measure of a surface position on an object than a center position of the intensity peak.

FIG. 5 schematically exemplifies another situation when an edge position of an intensity peak 505 is a good and better measure of a surface position 525 on an object than a center position of the intensity peak. FIG. 5 should be compared to FIG. 4. Everything of the object may be the same in FIG. 5 as in FIG. 4 except that there is a translucent or transparent material layer 521 that is thinner than the translucent or transparent material layer 421 in FIG. 4. The comparison is for illustrating that edge position has been observed to be a more accurate measure than center position substantially independent on thickness of the substantially translucent or transparent material that the surface position, e.g. surface position 425a or 525, is located on. When the translucent or transparent material layer becomes thinner, the intensity peak is typically becoming less and less wide, as also indicated in the figure.

Figure 6:
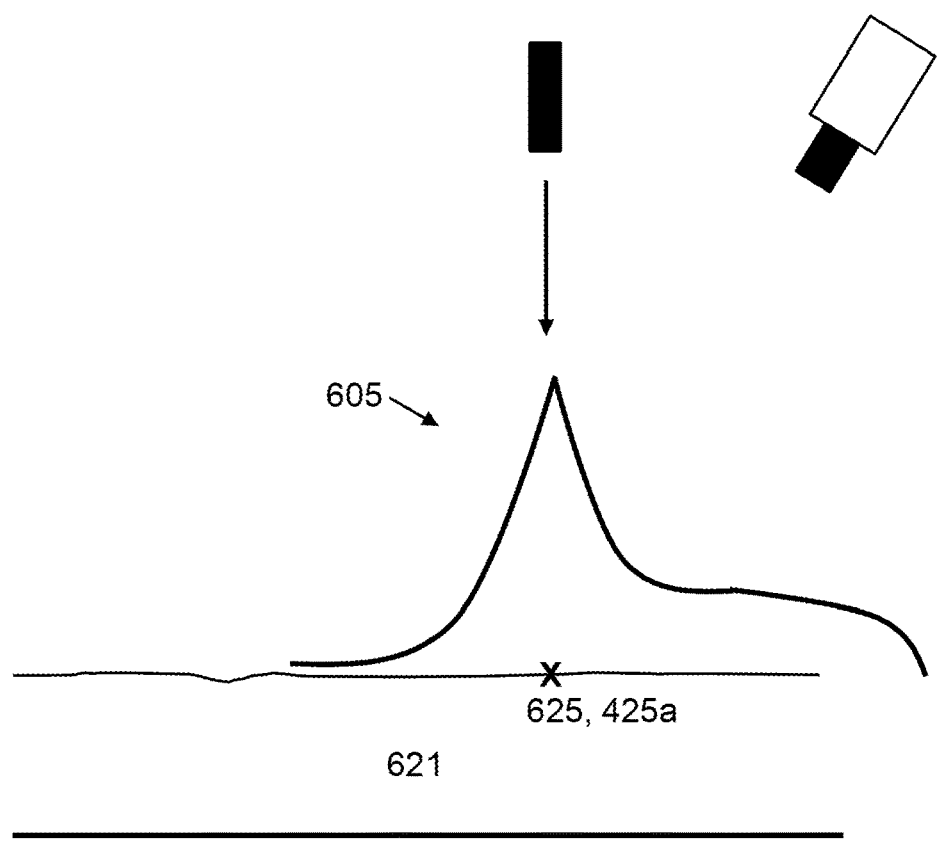
FIG. 6 schematically exemplifies a situation when a center position of an intensity peak has become a good measure of a surface position on an object.

FIG. 6 schematically exemplifies a situation when a center position of an intensity peak 605 becomes a good measure of the surface position 425a. FIG. 6 should be compared to FIG. 4. Everything on the object may be the same in FIG. 6 as in FIG. 4, as also indicted by some reference numerals that are the same in the figures, except that in FIG. 5 there is a material layer 621 that is the translucent or transparent material layer 421 after it has changed properties, e.g. when a wet glue that was constituting the translucent or transparent material layer 421 has dried and become the material layer 621. The changed material properties e.g. from drying of the glue, has made the surface 422 reflective, perhaps more and more reflective and increasingly opaque until the drying process stops and the glue is dry and hard. As a result a sub-peak becomes visible at the edge and may form with increasing height during the drying process. For some materials the end result may be a peak as in e.g. FIG. 3, i.e. the subpeak during the drying in the end becomes a peak corresponding to the one in FIG. 3. If the end result instead is as schematically illustrated in FIG. 6, this may be due to that the surface has become substantially reflective, i.e. to some significant extent opaque, but at the same time to some degree remains translucent or transparent for the incident light. Nevertheless, when the surface become sufficiently reflective and the sub-peak is formed, the intensity will mainly be concentrated to the sub-peak and it will become a good measure of the surface position 635 that thus may be the same position as the surface position 425a.

Using edge positions has found to correlate well with reference measurements on the same surface but after a the glue surface has hardened and by this also caused increased and visible reflections on the surface. Also, thicker glue gives a wider observed peak, as illustrated above, and thus a larger error for a peak center measurement, i.e. if center positions of intensity peaks are used.

Figure 7A:
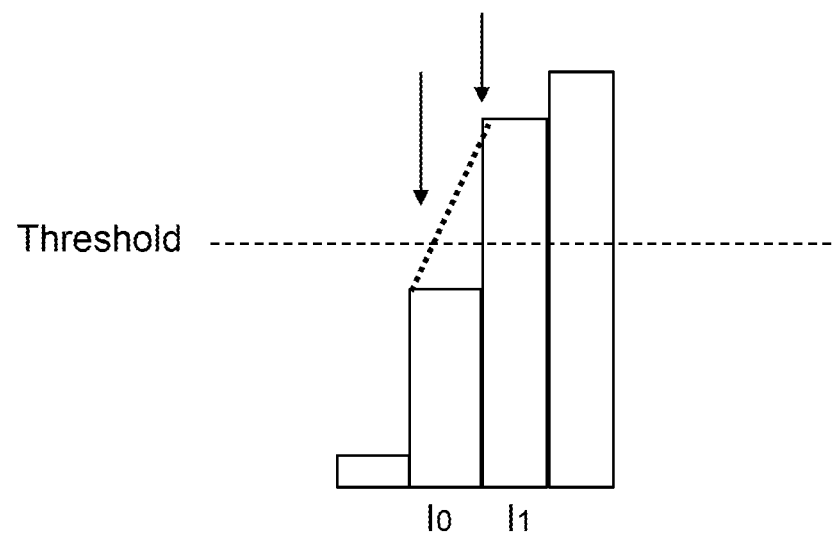
FIGS. 7A-B schematically illustrate different ways of how an edge position of an intensity peak can be determined by a computing algorithm.
Figure 7B:
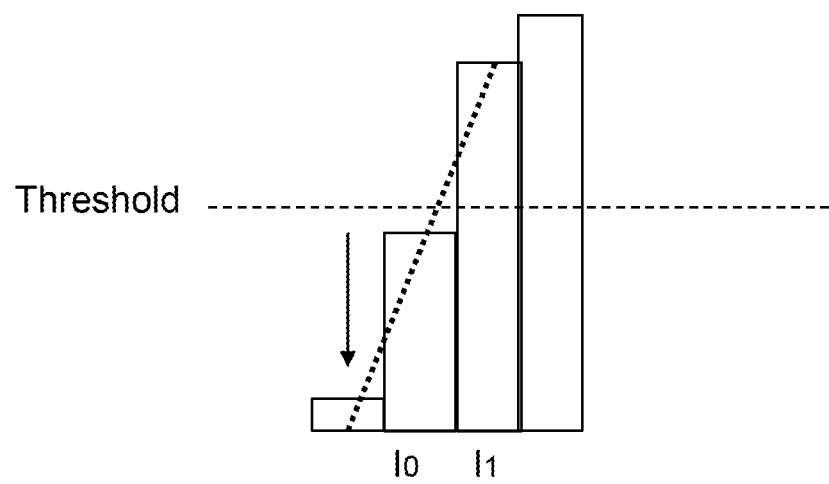

FIGS. 7A-B schematically illustrate different ways of how an edge position of an intensity peak can be determined by a computing algorithm. The figures shows intensity values for 4 pixels, with one pixel having a first intensity value I0 and a subsequent, neighboring pixel has a second intensity value I1. There is further a predefined, e.g. predetermined, threshold value as indicted in the figures.

A simple and a bit coarse way is to determine the edge position as the position of the first pixel with an intensity value that is above the threshold value, i.e. in FIG. 7A, as indicated by one of the arrows, the position of the pixel with I1.

Another way is to compute a subpixel position, such as indicated by the other arrow in the FIG. 7A, for example according to:

$$\text{Position of } I0+(\text{Threshold value}-I0)/(I1-I0) \quad \text{(Equation 1)}$$

where I0 here represent the last intensity value below the threshold value and I1 the first intensity value above the threshold value.

Yet another way is to, as illustrated in FIG. 7B, estimate the subpixel position of the "peak start", i.e. where the increase of intensity values started which resulted in that the threshold value was passed. Hence, when the threshold value has been passed, here for the pixel with I1, the peak start may be estimated according to:

$$\text{Position of } I0-I0/(I1-I0) \quad \text{(Equation 2)}$$

A general problem with intensity peaks for which the edge position shall be used, is that they are weak, i.e. their height and highest intensity value are relatively small and finding an edge position may in particular suffer from this. The edges may e.g. be obscured by noise making it difficult to find the edge position or that the edge position cannot be determined with a desirable accuracy. To overcome this, longer exposure times may be used to produce the intensity peaks and a computing algorithm to determine edge position may operate on these intensity peaks. Conventionally, for intensity peaks as in e.g. FIG. 3, longer exposure time may saturate the highest intensity values of the peak making them all the same and thereby making it more difficult to find an accurate center position, i.e. longer exposure times may in that case instead reduce accuracy. However, when an edge position is to be determined, the center does not matter.

Figure 8A:
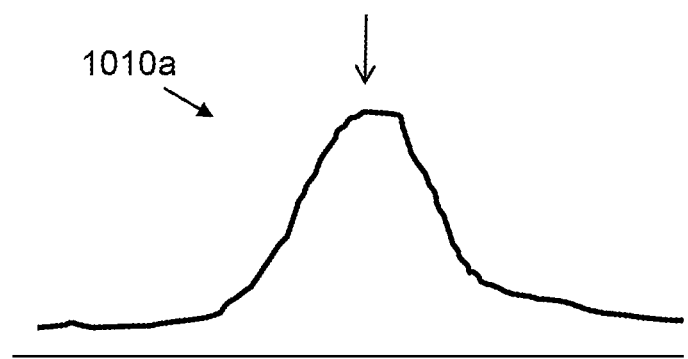
FIG. 8A-B schematically shows how increased exposure can be used when edge position of an intensity peak shall be determined.
Figure 8B:
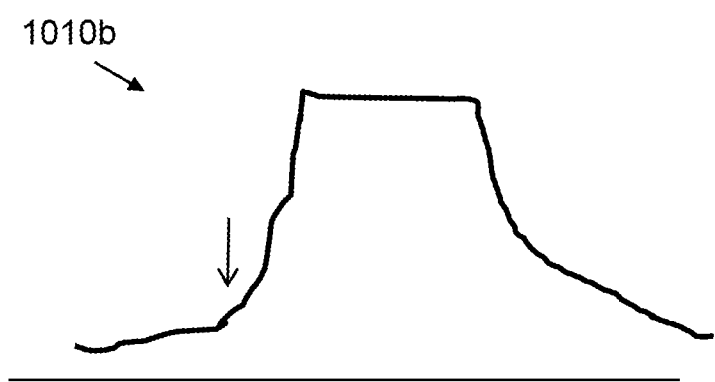

FIGS. 8A-B schematically shows how increased exposure can be used when edge position of an intensity peak 805a shall be determined. In FIG. 8A a conventional exposure time suitable when a center position of an intensity peak shall be determined, as indicated in the figure by an arrow pointing to the center. FIG. 8B shows when a longer exposure time than in 8A has been used, resulting in overall higher intensity values, facilitating determining an edge position of the intensity peak, as indicated by another arrow pointing to the first edge, although this as also shown, in the center of the intensity peak results in saturation due to over exposure.

Figure 9A:
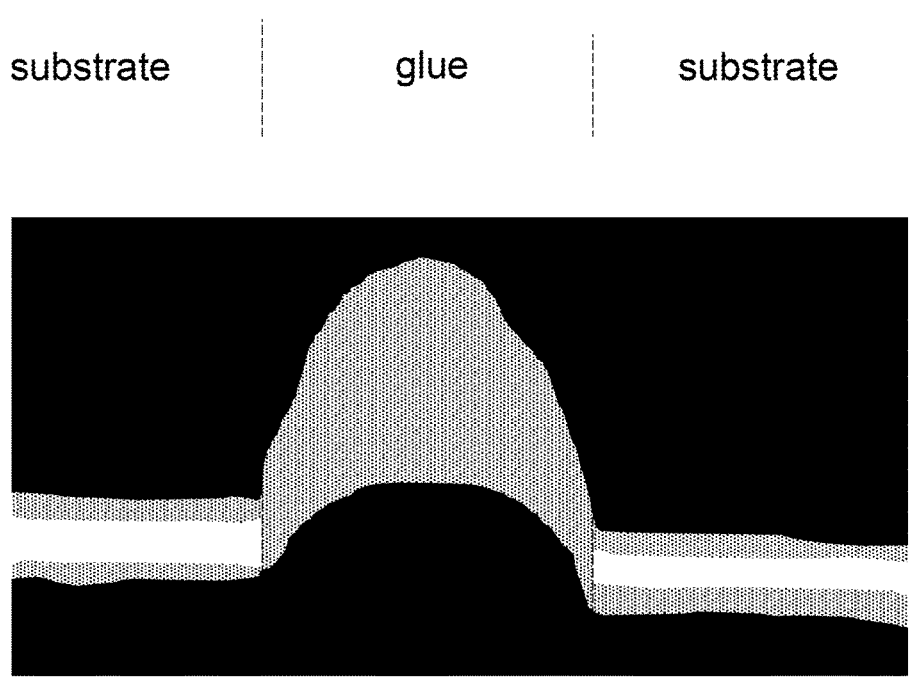
FIG. 9A illustrates how intensities in an 3D image of an object may be distributed for different parts of the object.

FIG. 9A illustrates how intensities in an image of an object, as captures by the image sensor, may be distributed for different parts of the object. The here imaged part of the object consists of an opaque substrate with part of the substrate covered by glue, where the glue is such translucent or transparent material as discussed above that substantially reflects nothing of the light by its surface, while the substrate is opaque and reflective. The white portions indicate pixels with higher intensity and the gray portions pixels with lower intensities. The black portions illustrates where no substantial light, from reflections in the object, has been received by the image sensor. As can be seen, the received intensities are spread out and weaker for the glue and stronger and more narrow and concentrated for the substrate.

Figure 9B:
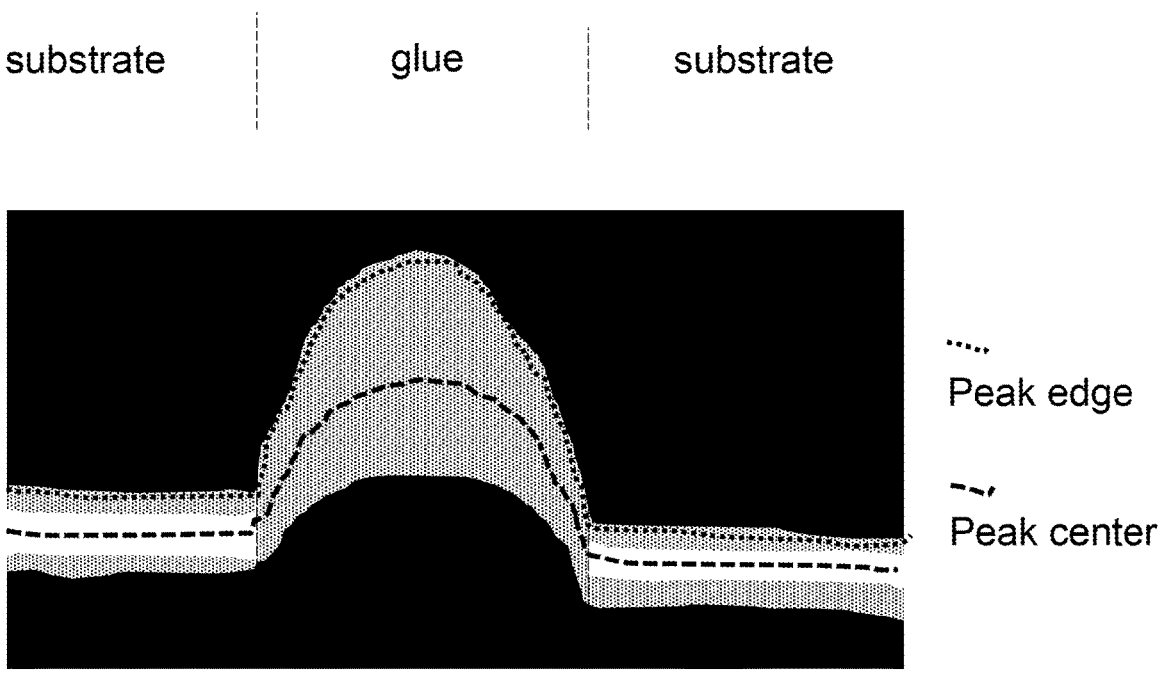
FIG. 9B is FIG. 9A but where positions of intensity peaks also has been drawn according to two different computing algorithms for determining the positions.

FIG. 9B is FIG. 9A but where positions of intensity peaks also has been drawn according to two different computing algorithms for determining the positions. One for determining center positions, i.e. peak center, and one for determining edge positions, i.e. peak edge. Hence, these computing algorithms, if used for imaging the same profile of the object at the same time, would provide different results. Both can of course not be correct. The greatest difference is regarding the glue. When the center positions have been used, the result is an imaged height of the glue that is significantly lower than the height imaged when edge positions have been used. In conclusion, and as should be realized from the foregoing, the edge positions provide a more accurate measure regarding the glue and the center positions provide a more accurate measure regarding the substrate. By combining the computing algorithms, i.e. use both for an object as in the figure, but dependent on which part of the object is to be imaged, the best result can be achieved, i.e. that provides the most accurate 3D image of the object both for the glue and the substrate.

Since the characteristic of the intensity peaks correlate to the type of surface material, as explained above, it is realized that these characteristics can be used to determine which position to be used in the resulting image.

A classification of the peaks can be made using information on said characteristics, e.g. the peak intensity and/or shape, e.g. laser scatter measurements of different kind, such as relating to intensity beside the peak and/or width of the peak. Which class the peak then belongs to can be used to determine which position that will be the most accurate measure.

Figure 10A:
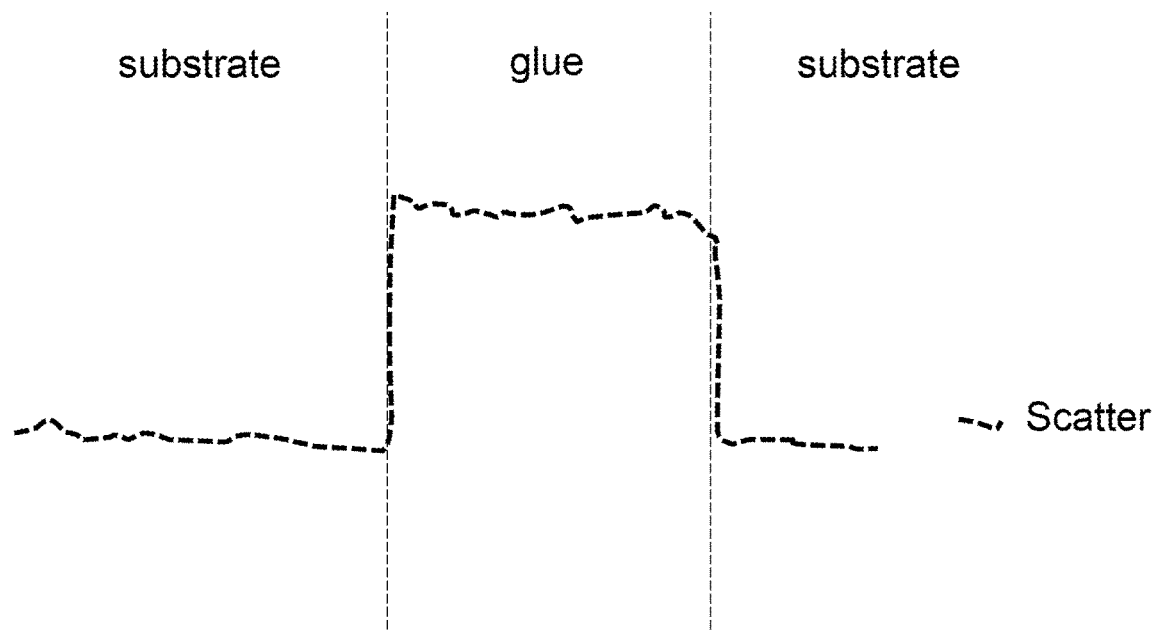
FIGS. 10A-B schematically shows how scatter measurements can be used for determining characteristics of an intensity peak.
Figure 10B:
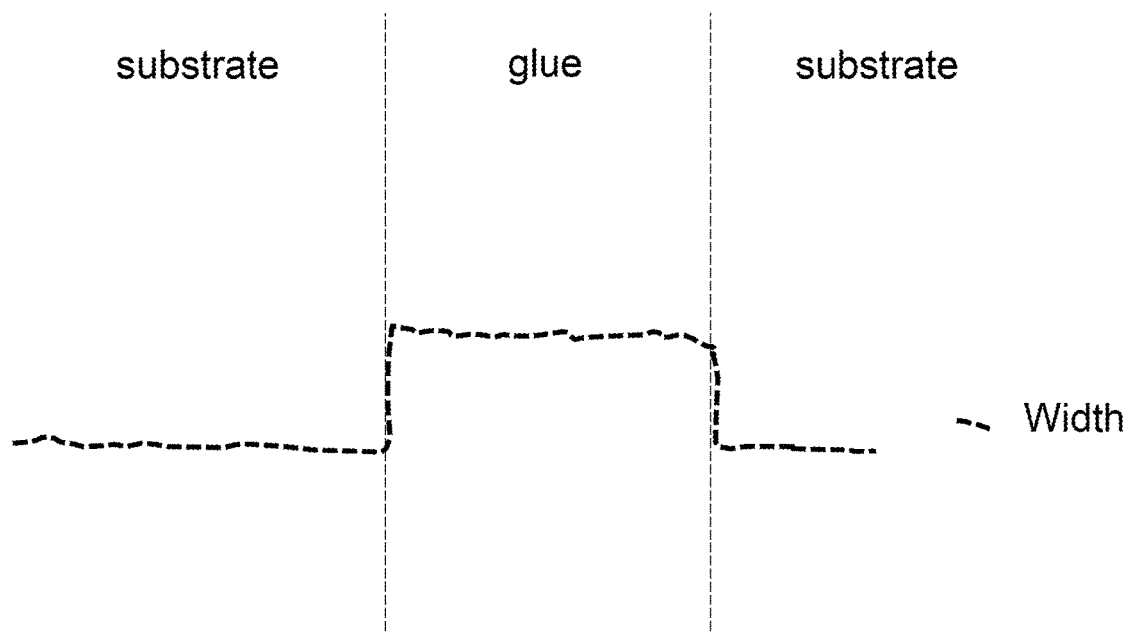

FIGS. 10A-B schematically illustrates how different kind of information can be provided, e.g. computed, and then used to determine characteristics of the intensity peaks and/or classify each peak. The figures may be compared to FIGS. 9A-B since they relate to the same image data.

In FIG. 10A measures of scatter of the intensity peaks have been used, e.g. by measurements and/or computation on the image data with intensities as shown in FIG. 9A. There are different algorithm available to provide measure of scatter. On way of measuring scatter is disclosed in EP1985969. As seen in the figure, scatter measures can make it very easy to determine characteristics, or class, of a peak. If the scatter measure is above a certain, e.g. predefined threshold, it may be determined that the intensity peak is associated with, e.g. have, certain characteristics which in turn indicate what position, e.g. edge or center, is suitable to use for the intensity peak.

In FIG. 10B, measures of the widths of the intensity peaks have been used. As can be seen there is a clear difference also here although the difference is not as evident as in the case of scatter measures in FIG. 10A.

To sum up some conclusions from the above. In certain 3D light triangulation applications the conventional center positions of the intensity peaks cannot be used for accurate imaging. They will e.g. not result in accurate enough measurements on some glue surfaces. This is due to large scattering of the light within a semi-transparent medium such as the glue. An application area where this may be of interest is inspection of the shape of an object with transparent or semi-transparent surfaces, e.g. in case of a layer of glue on a substrate. It may e.g. be important to measure the shape of the substrate and at the same time the shape of the glue e.g. be able to accurately calculate the shape of a glue bead to ensure that it is within specification. Embodiments herein enable accurate 3D position measurement of both glue and substrate surfaces.

Figure 11:
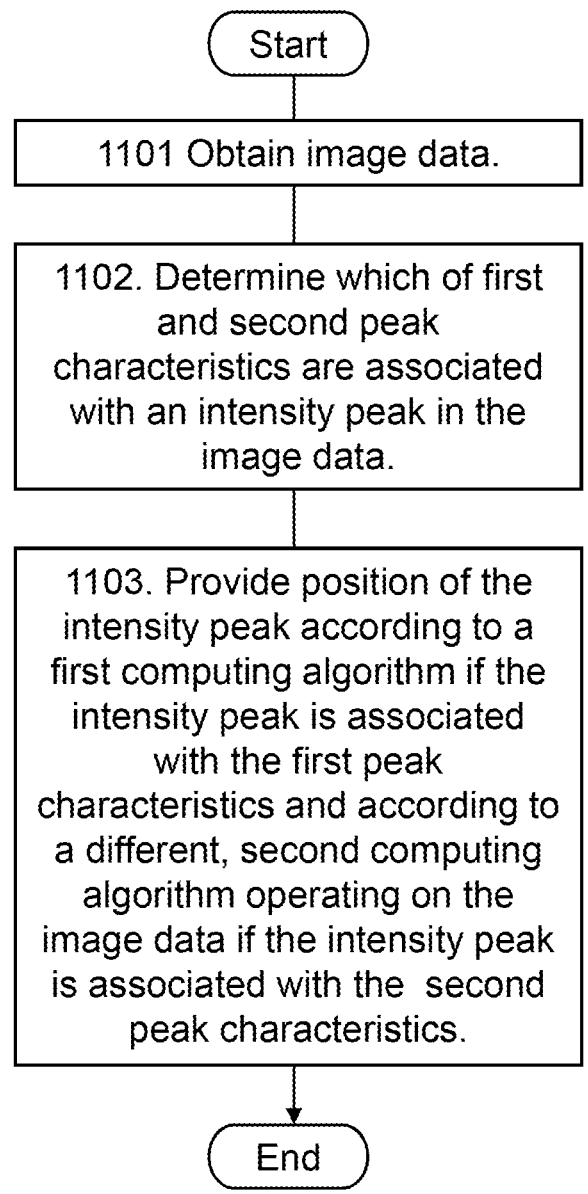
FIG. 11 is a flowchart schematically illustrating embodiments of a method according to embodiments herein.

FIG. 11 is a flowchart schematically illustrating embodiments of a method based on the above and according to embodiments herein. The actions below, which may form the method, are for providing a position of an intensity peak, e.g. any one of the intensity peaks 305, 405, 505, 605, in image data produced by an image sensor, e.g. the image sensor 131, in response to light sensed by the image sensor after the light has reflected on an object as part of light triangulation performed in a 3D imaging system, e.g. the 3D imaging system 100. As should be realized, the image data typically comprise or correspond to pixels of an image sensed by the image sensor.

The method and/or actions may be performed by device(s), i.e. one or more devices, that are further discussed separately below.

Further, note that the actions below may be taken in any suitable order and/or be carried out fully or partly overlapping in time when this is possible and suitable.

Action 1101

The device(s) obtains the image data. The image data may e.g. be obtained within the image sensor 131 and/or camera unit 130, and/or a separate device or unit, e.g. the computing device 201, may obtain it by receiving it from the image sensor 131 and/or camera unit 130.

Action 1102

The device(s) determines which of first and other, second, peak characteristics that the intensity peak is associated with. The first and second characteristics may in some embodiments be attributed to first and second classifications of intensity peaks, respectively. That is, each intensity peak may be classified into, i.e. determined to be of either a first or second class, or type, where each such class or type is associated with different peak characteristics. For example, if the intensity peak is determined to be of a first class it is associated with the first characteristics and if the intensity peak is determined to be of the second class it is associated with the second peak characteristics.

Said determination, regarding which of said first and said second peak characteristics that the intensity peak is associated with, may be based on an indication of shape and/or height of the intensity peak. It is realized from the previous figures and discussion that the shape and/or height are suitable to find out which peak position is most suitable to use. The indication may be based on measurement on the image data and/or be obtained, e.g. received, and for example comprised in assisting information provided by the image sensor in associated with the image data. Said indication of shape may e.g. be obtained from scatter measurements on the intensity peak and/or from information on width of the intensity peak and/or from information on height-to-width relation of the intensity peak.

In some embodiments, the intensity peak is determined to be associated with the first peak characteristics in response to that the height of the intensity peak is indicated to be above a predefined first height threshold and/or that the width of the intensity peak is indicated to be below a predefined first width threshold and/or that a height-to-width ratio is indicated to be greater than a predefined first height-to-width threshold.

In some embodiments, the intensity peak is determined to be associated with the second peak characteristics in response to that the height of the intensity peak is indicated to be below a predefined second height threshold and/or that width of the intensity peak is indicated to be above a predefined second width threshold and/or that a height-to-width ratio of the intensity peak is indicated to be below a predefined second height-to-width threshold.

Since it may be predetermined that each intensity peak is either associated with the first or the second characteristics, e.g. by being classified into either one of two classes as discussed above, it is realized that it in practice may suffice to check if the intensity peak is associated with one of the two characteristics, and if not, it can be concluded that it is associated with the other characteristics.

In some embodiments, the intensity peak is determined to be associated with first peak characteristics in response to indication that the intensity peak is resulting from reflections on an opaque part of the object. In some embodiments, the intensity peak is determined to be associated with second peak characteristics in response to indication that the intensity peak is resulting from reflections within an a substantially translucent and/or transparent part of the object. The substantially translucent and/or transparent part of the object may correspond to a part of glue or glass. The indications here may of course also be based on e.g. height and/or shape of the intensity peak since that may indicate from what kind of surface and type of material the reflections come from, but can also be e.g. based on information on the object being imaged, such as based on knowledge that a certain type of objects are to be imaged and/or that parts of the object being imaged will be opaque or translucent and/or transparent. In some embodiments, the indications, as well as the peak positions, for multiple neighboring measurements are processed together so as to obtain a filtered indication used for selection, said filtered indication giving a more robust selection with respect to noise from e.g. laser speckles.

Action 1103

The device(s) provides the position according to a first computing algorithm operating on the image data if the intensity peak is associated with the first peak characteristics and according to a different, second computing algorithm operating on the image data if the intensity peak is associated with the second peak characteristics.

The first computing algorithm may relate to determining a center position of the intensity peak. The first computing algorithm may e.g. be based on determining the center position according to some conventional method of doing this, e.g. relate to determining position of a highest intensity associated with the intensity peak.

The second computing algorithm relates to determining position of an edge of the intensity peak. For example, the second computing algorithm may relate to determining the position based on where intensity values of the intensity peak increase above a predefined edge threshold value. The second computing algorithm may e.g. be based on what was disclosed above in relation to FIGS. 7A-B.

In some embodiments, the image data comprise two intensity values per pixel, resulting from a first exposure time and from another, second exposure time, respectively. The intensity values resulting from the first exposure time may then be used for providing the position according to the first computing algorithm and intensity values resulting from the second exposure time may be used for providing the position according to the second computing algorithm. In some embodiment, the second exposure time is longer that the first exposure time, in particular should this be the case when the second computing algorithm relates to finding an edge position. Reasons for this was e.g. discussed above in relation to FIG. 8.

Moreover, as should be understood, the method and actions above may e.g. be performed for image data of each column of the image sensor, resulting in provision of one intensity peak position per column, the provided positions forming a profile, or contour, of an object that has been imaged by the image sensor, i.e. the result being a 3D profile image of the object e.g. corresponding to any one of the intensity profile images 140-1-140-N. Or more generally, the actions below may e.g. be performed for multiple intensity peaks in the image data to thereby, for example, enable 3D imaging of a contour of the object at positions of the object, desirably on its surface, where the light was reflected. The intensity peaks may thus be associated with sets, respectively, of consecutively occurring pixels in the image data, where e.g. each set may be pixels of a column or row of pixels.

The method and/or actions above may be performed e.g. by in principle any device(s) with suitable computing and/or processing capabilities on obtained image data, such as from the image sensor or e.g. be the image sensor as such. The device(s) may in some embodiments comprise both the image sensor, e.g. 131, and a computing device, e.g. the computing device 201, where the image sensor e.g. may provide two peak positions, one per algorithm, and possibly the image data and/or some assisting information on characteristics of the intensity peaks, such as information on height and/or scatter of the intensity peaks, etc. The computing device may then obtain the peak positions and the assisting information and use it to determine which of the first and second peak characteristics that the peak is associated with and then provide the (best) peak position from the two peak positions accordingly. Hence, said method and/or actions above may be performed by one or more devices, e.g. the 3D imaging system 100, the camera unit 130, the image sensor 131, the exemplary system 200, the computing device 201.

In conclusion, embodiments herein may thus be considered based on that at least two computing algorithms, such as discussed above are available, and potentially both are used for each intensity peak, but only one is in the end used for providing the position to be used in the 3D image, which of course should be the algorithm best suitable as discussed herein. Using the best suitable algorithm is enabled by determining which of the two peak characteristics that the intensity peak is associated with and then providing the position accordingly. Using peak characteristics for this purpose is possible since, as indicated above and explained further elsewhere herein, the characteristics of the peak indicate which computing algorithm of the two that is best suitable for providing a position that most accurately map to the location on the object's surface that reflected the light resulting in the intensity peak.

Hence, thanks to embodiments herein, it is enabled provision of more accurate 3D images object by means of light, e.g. laser, triangulation performed by a 3D-imaging system when the object comprise a mix of surfaces with different properties that reflects light differently and thereby benefit from different ways of finding positions of the intensity peaks. In particular more accurate 3D images are enabled when an object being imaged comprises surfaces that are mainly opaque and surfaces that to some substantial degree are translucent or transparent, such as in the case of object that comprise some solid material surfaces and some with e.g. glue. Such object may be formed when a solid first part, that is to be mounted to another second part, for this purpose has been provided with glue.

Figure 12:
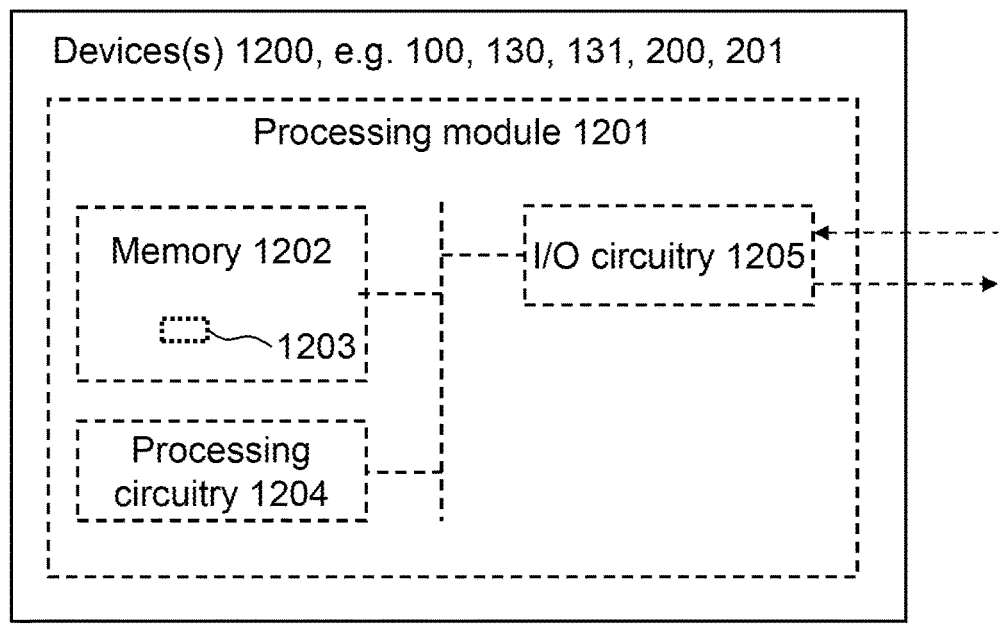
FIG. 12 is a functional block diagram for illustrating embodiments of one or more devices according to embodiments herein and how such device can be configured to carry out the method and actions described in relation to FIG. 11.

FIG. 12 is a schematic block diagram for illustrating embodiments of one or more devices 1200, i.e. device(s) 1200, that may be the devices(s) discussed above in relation to FIG. 11 for performing the method and/or actions. The schematic block diagram is also for illustrating embodiments of how the device(s) 1200 may be configured to perform the method and actions discussed above in relation to FIG. 11.

Hence, the device(2) 1200 is for providing a position of an intensity peak in image data produced by an image sensor in response to light sensed by the image sensor after the light has reflected on an object as part of light triangulation performed in a three-dimensional imaging system.

The device(s) 1200 may comprise a processing module 1201, such as processing means, one or more hardware modules, including e.g. one or more processing circuits, circuitry, such as processors, and/or one or more software modules for performing said method and/or actions.

The device(s) 1200 may further comprise memory 1202 that may comprise, such as contain or store, a computer program 1203. The computer program 1203 comprises 'instructions' or 'code' directly or indirectly executable by the device(s) 1200 to perform said method and/or actions. The memory 1202 may comprise one or more memory units and may further be arranged to store data, such as configurations, data and/or values, involved in or for performing functions and actions of embodiments herein.

Moreover, the device(s) 1200 may comprise processing circuitry 1204 involved in processing and e.g. encoding data, as exemplifying hardware module(s) and may comprise or correspond to one or more processors or processing circuits. The processing module(s) 1201 may comprise, e.g. 'be embodied in the form of' or 'realized by' the processing circuitry 1204. In these embodiments, the memory 1202 may comprise the computer program 1203 executable by the processing circuitry 1204, whereby the device(s) 1200 is operative, or configured, to perform said method and/or actions thereof.

Typically the device(s) 1200, e.g. the processing module(s) 1201, comprises an Input/Output (I/O) module(s) 1205, configured to be involved in, e.g. by performing, any communication to and/or from other units and/or devices, such as sending and/or receiving information to and/or from other devices. The I/O module(s) 1205 may be exemplified by obtaining, e.g. receiving, module(s) and/or providing, e.g. sending, module(s), when applicable.

Further, in some embodiments, the device(s) 1200, e.g. the processing module(s) 1201, comprises one or more of obtaining module(s), providing module(s), encoding modules(s), as exemplifying hardware and/or software module(s) for carrying out actions of embodiments herein. These modules may be fully or partly implemented by the processing circuitry 804.

The device(s) 1200, and/or the processing module(s) 1201, and/or the processing circuitry 1204, and/or the I/O module(s) 805, and/or the obtaining module(s) may thus be operative, or configured, to, obtain said image data, as described above in connection with FIG. 11.

Further, the device(s) 1200, and/or the processing module(s) 1201, and/or the processing circuitry 1204, and/or the determining module(s) may be operative, or configured, to, determine which of first and other, second, peak characteristics that the intensity peak is associated with, as described above in connection with FIG. 11.

Moreover, the device(s) 1200, and/or the processing module(s) 1201, and/or the processing circuitry 1204, and/or the I/O module(s) 1205, and/or the providing module(s) may thus be operative, or configured, to provide, the position according to said first computing algorithm operating on the image data if the intensity peak is associated with the first peak characteristics and according to said different, second computing algorithm operating on the image data if the intensity peak is associated with the second peak characteristic, i.e. as described above in connection with FIG. 11.

Figure 13:
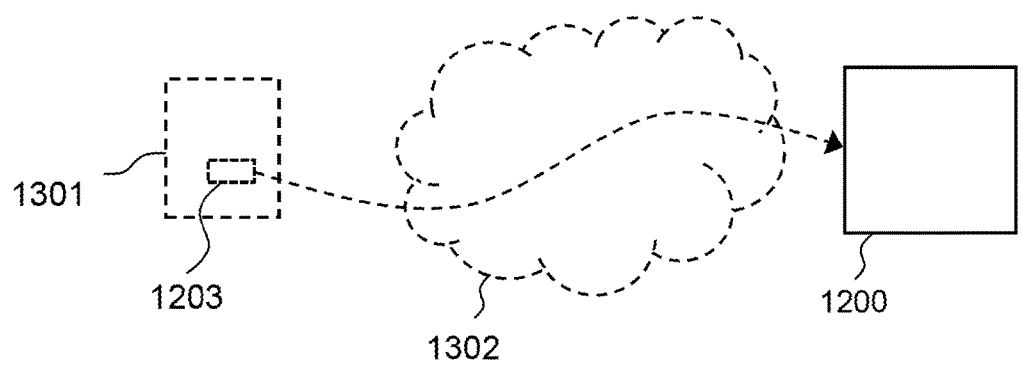
FIG. 13 is a schematic drawing illustrating embodiments relating to a computer program, and carriers thereof, to cause said one or more devices to perform the method and actions described in relation to FIG. 11.

FIG. 13 is a schematic drawing illustrating some embodiments relating to computer program and carriers thereof to cause said device(s) 1200 discussed above to perform said method and actions.

The computer program may be the computer program 1203 and comprises instructions that when executed by the processing circuitry 1204 and/or the processing module(s) 1201, cause the device(s) 1200 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 1301 as schematically illustrated in the figure. The computer program 1203 may thus be stored on the computer readable storage medium 1301. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 901 may be used for storing data accessible over a computer network 1302, e.g. the Internet or a Local Area Network (LAN). The computer program 1303 may furthermore be provided as pure computer program(s) or comprised in a file or files. The file or files may be stored on the computer readable storage medium 1301 and e.g. available through download e.g. over the computer network 1302 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processing circuitry 1204. The file or files may also or alternatively be for intermediate download and compilation involving the same or another processor(s) to make them executable before further download and execution causing said device(s) 1200 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. One or more devices for providing a position of an intensity peak in image data produced by an image sensor in response to light sensed by the image sensor after the light has reflected on an object as part of light triangulation performed in a three-dimensional imaging system, wherein said one or more devices are configured to:
   obtain the image data;
   determine which of first and other, second, peak characteristics that the intensity peak is associated with, wherein the first and second peak characteristics are associated with differing first and second surface properties of the object that reflect light differently; and
   provide the position according to a first computing algorithm operating on the image data if the intensity peak is associated with the first peak characteristics and according to a different, second computing algorithm operating on the image data if the intensity peak is associated with the second peak characteristics, wherein the first and second computing algorithms are associated with said first and second surface properties, respectively, and wherein the respective computing algorithm is predetermined based on its suitability to, for intensity peaks resulting from reflections from a surface according to the algorithm's associated surface property, provide a position that maps to the location on the object's surface that reflected the light that resulted in the intensity peak.

2. The one or more devices as claimed in claim 1, wherein the first computing algorithm relates to determining a center position of the intensity peak.

3. The one or more devices as claimed in claim 2, wherein the first computing algorithm relates to determining position of a highest intensity associated with the intensity peak.

4. The one or more devices as claimed in claim 1, wherein the second computing algorithm relates to determining position of an edge of the intensity peak.

5. The one or more devices as claimed in claim 4, wherein the second computing algorithm relates to determining the position based on where intensity values of the intensity peak increase above a predefined edge threshold value.

6. The one or more devices as claimed in claim 1, wherein said determination, regarding which of said first and said second peak characteristics that the intensity peak is associated with, is based on an indication of shape and/or height of the intensity peak.

7. The one or more devices as claimed in claim 6, wherein said indication of shape is obtained from scatter measurements on the intensity peak and/or from information on width of the intensity peak and/or from information on height-to-width relation of the intensity peak.

8. The one or more devices as claimed in claim 1, wherein the intensity peak is determined to be associated with the first peak characteristics in response to that the height of the intensity peak is indicated to be above a predefined first height threshold and/or that the width of the intensity peak is indicated to be below a predefined first width threshold and/or that a height-to-width ratio is indicated to be greater than a predefined first height-to-width threshold, and/or
wherein the intensity peak is determined to be associated with the second peak characteristics in response to that the height of the intensity peak is indicated to be below a predefined second height threshold and/or that width of the intensity peak is indicated to be above a predefined second width threshold and/or that a height-to-width ratio of the intensity peak is indicated to be below a predefined second height-to-width threshold.

9. The one or more devices as claimed in claim 1, wherein the intensity peak is determined to be associated with first peak characteristics in response to an indication that the intensity peak is resulting from reflections on an opaque part of the object, and/or wherein the intensity peak is determined to be associated with second peak characteristics in response to an indication that the intensity peak is resulting from reflections within a substantially translucent and/or transparent part of the object.

10. The one or more devices as claimed in claim 9, wherein the substantially translucent and/or transparent part of the object corresponds to a part of glue or glass.

11. The one or more devices as claimed in claim 1, wherein the image data comprise two intensity values per pixel, resulting from a first exposure time and from another, second exposure time, respectively, wherein the intensity values resulting from the first exposure time are used for providing the position according to the first computing algorithm and intensity values resulting from the second exposure time are used for providing the position according to the second computing algorithm.

12. The one or more devices as claimed in claim 11, wherein the second exposure time is longer that the first exposure time.

13. Method, performed by one or more devices, for providing a position of an intensity peak in image data produced by an image sensor in response to light sensed by the image sensor after the light has reflected on an object as part of light triangulation performed in a three-dimensional imaging system, wherein the method comprises:
obtaining the image data;
determining which of first and other, second, peak characteristics that the intensity peak is associated with, wherein the first and second peak characteristics are associated with differing first and second surface properties of the object that reflect light differently; and
providing the position according to a first computing algorithm operating on the image data if the intensity peak is associated with the first peak characteristics and according to a different, second computing algorithm operating on the image data if the intensity peak is associated with the second peak characteristics, wherein the first and second computing algorithms are associated with said first and second surface properties, respectively, and wherein the respective computing algorithm is predetermined based on its suitability to, for intensity peaks resulting from reflections from a surface according to the algorithm's associated surface property, provide a position that maps to the location on the object's surface that reflected the light that resulted in the intensity peak.

14. A non-transitory computer-readable medium encoding instructions that when executed by said one or more devices causes the one or more devices to perform the method according to claim 13.

15. Carrier comprising the non-transitory computer-readable medium encoding instructions according to claim 14, wherein the carrier is one of an electronic signal, optical signal, radio signal or computer readable storage medium.

* * * * *